(12) United States Patent
Mitchell

(10) Patent No.: US 6,370,857 B1
(45) Date of Patent: Apr. 16, 2002

(54) RAKE WITH DETACHABLE HEAD

(76) Inventor: David Mitchell, 6779 Waverly, Montreal, Quebec (CA), H2S 3H8

( * ) Notice: Subject to any disclaimer, the term of this patent is extended or adjusted under 35 U.S.C. 154(b) by 0 days.

(21) Appl. No.: 09/506,665

(22) Filed: Feb. 17, 2000

(30) Foreign Application Priority Data

May 27, 1999 (CA) .............................................. 2273320
Oct. 26, 1999 (CA) .............................................. 2287667

(51) Int. Cl.[7] .............................. A01D 7/04; A01D 7/10

(52) U.S. Cl. ................................ 56/400.19; 56/400.04; 56/400.12

(58) Field of Search ........................ 56/400.01, 400.04, 56/400.12, 400.16, DIG. 21, 400.18, 400.17, 400.19, 400.2; D8/13

(56) References Cited

U.S. PATENT DOCUMENTS

| 2,767,545 | A | * | 10/1956 | Jenkins | .................... 56/400.06 |
| 3,073,103 | A | * | 1/1963 | Kikuchi | ................... 56/400.18 |
| 4,292,794 | A | | 10/1981 | Gascon | |
| 5,414,982 | A | | 5/1995 | Darnell | |
| 5,440,868 | A | | 8/1995 | Darnell | |

* cited by examiner

Primary Examiner—Thomas B. Will
Assistant Examiner—Meredith C. Petravick
(74) Attorney, Agent, or Firm—Darby & Darby

(57) ABSTRACT

A rake made of a first rake part having a handle and a first rake head section connected to one end of the handle, and a second rake part having a second rake head section. The section rake part is detachably connected to the first rake part in a manner to have the first and second rake head sections form a full rake head. The second rake part is detachable from the first rake part for use alone, or with the first rake part to grasp a pile of debris.

14 Claims, 7 Drawing Sheets

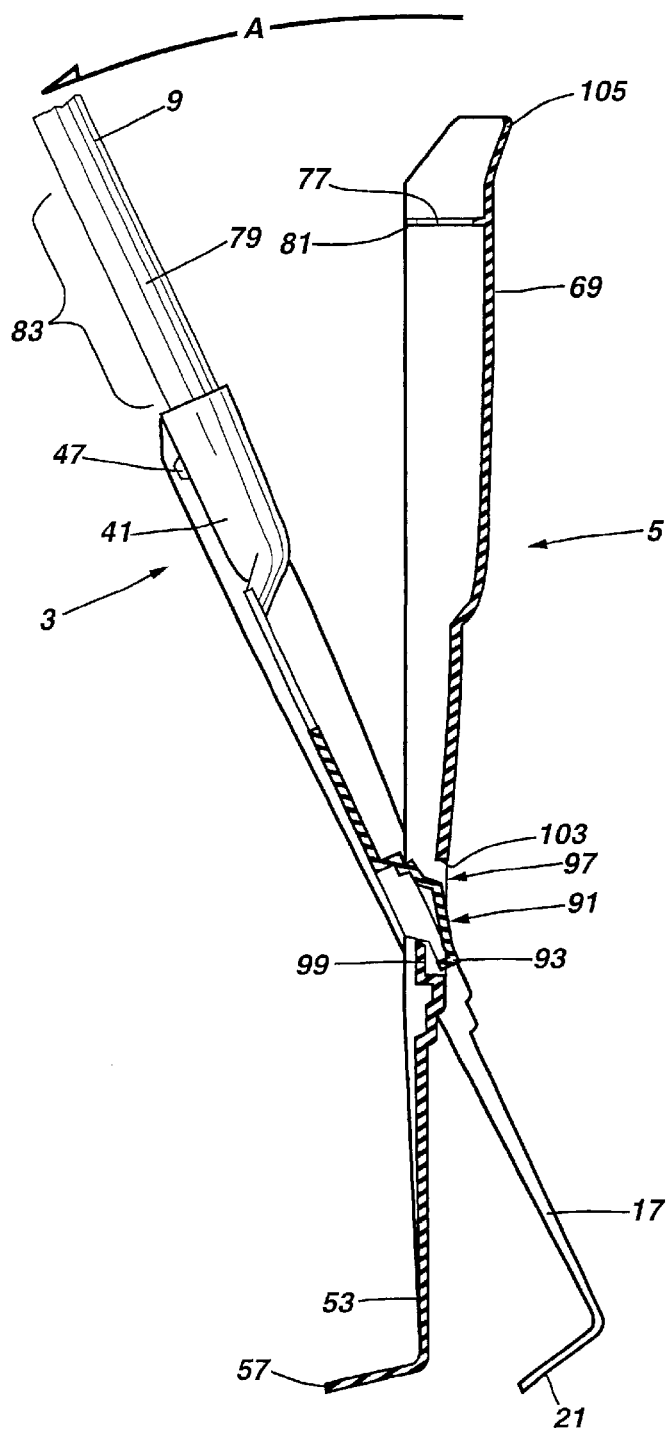
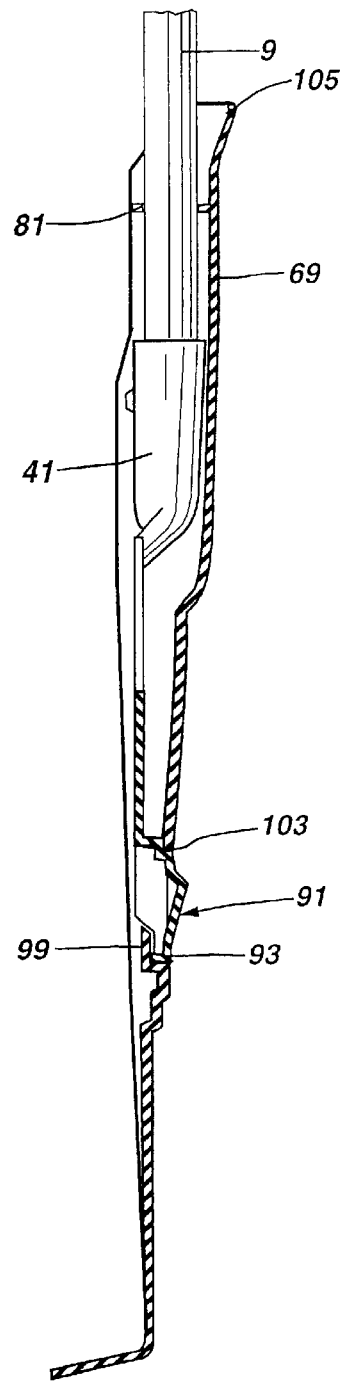
*Fig.9*     *Fig.10*

RAKE WITH DETACHABLE HEAD

FIELD OF INVENTION

This invention is directed toward an improved rake.

More particularly, the invention is directed toward an improved rake comprising two detachably connected rake parts. When the two rake parts are connected, a normal rake is formed which is used to rake debris, such as leaves, together in a pile. When they are detached, the parts can be used to grasp the pile debris between them to transfer the pile to a container or the like.

BACKGROUND ART

Many rakes are known for use in not only raking leaves into a pile but for also transferring these piled leaves into a container. In some of these known transfer rakes, the rake is provided with a first tined part attached to a handle and a second tined part partially overlying and adjacent to the first tined part. The handle is manipulated to have the first tined part rake the leaves into a pile. Then the second tined part is moved relative to the first tined part to grasp the pile, or a portion thereof, between the tined parts, acting in clam shell fashion, to transfer the pile to a container or the like. An example of such a rake is shown in U.S. Pat. No. 4,292,794. These types of transfer rakes are relatively expensive however because of the need for a second tined part and the need for the mechanism required to move the second tined part relative to the first tined part.

It is also known to provide transfer rakes where the tined portion of the rake is in two parts, the parts being hinged together in a manner where they can be folded toward each other to grasp leaves between them. Examples of such rakes are shown in U.S. Pat. Nos. 5,414,982 and 5,440,868. The folded parts however do not hold many leaves between them and such rakes are still relatively expensive because of the need for a special hinge between the parts.

SUMMARY OF THE INVENTION

An object of the present invention is to provide a rake of improved structure that can be used for both raking leaves into a pile and then transferring the pile or a portion thereof to a container, which rake is simpler in construction and less expensive to manufacture than known transfer rakes.

Another object of the present invention is to provide a transfer rake which is easier to use than the known rakes.

In accordance with the present invention, these objects are achieved with a rake comprising a first rake part and a second separate rake part. The first rake part has a first rake head, with tines, attached at one end to one end of a rake handle. The second rake part has a second rake head with tines. Cooperating connecting means are provided on both rake parts for detachably connecting the parts together in a manner to have the first and second rake heads side-by-side to form a full sized rake head. When the parts are connected together, the rake can be used as a normal full-sized rake to rake debris such as leaves into a pile. The parts are connected together in a manner to be non-movable relative to each other when the rake. When the parts are detached from each other, they can be used manually, one in each hand, in a clam shell manner to transfer the pile of debris to a container. The parts are easily detached/attached from/to one another.

More particularly, the invention as broadly claimed hereinafter is directed toward a rake having a first rake part and a second, separate rake part. The first rake part has a first rake head section and a rake handle connected at one end to one end of the first rake head section. The second rake part has a second rake head section. Cooperating, connecting means are provided on both rake parts to detachably connect the rake parts together side-by-side to have the first and second rake head sections form a full size rake head at the end of the handle. The connected rake parts forming the rake, can be used to rake debris into a pile. The rake parts, when detached, can be used to grasp between them and transfer the pile of debris.

The invention will be better understood upon reading the following non-restrictive description of a preferred embodiment thereof, made with reference to the accompanying drawings.

BRIEF DESCRIPTION OF THE FIGURES IN THE DRAWINGS

FIG. 9 is a cross-section view showing the two rake parts being assembled;

FIG. 10 is a cross-section view showing the rake parts assembled;

DESCRIPTION OF A PREFERRED EMBODIMENT OF THE INVENTION

Figure 1:
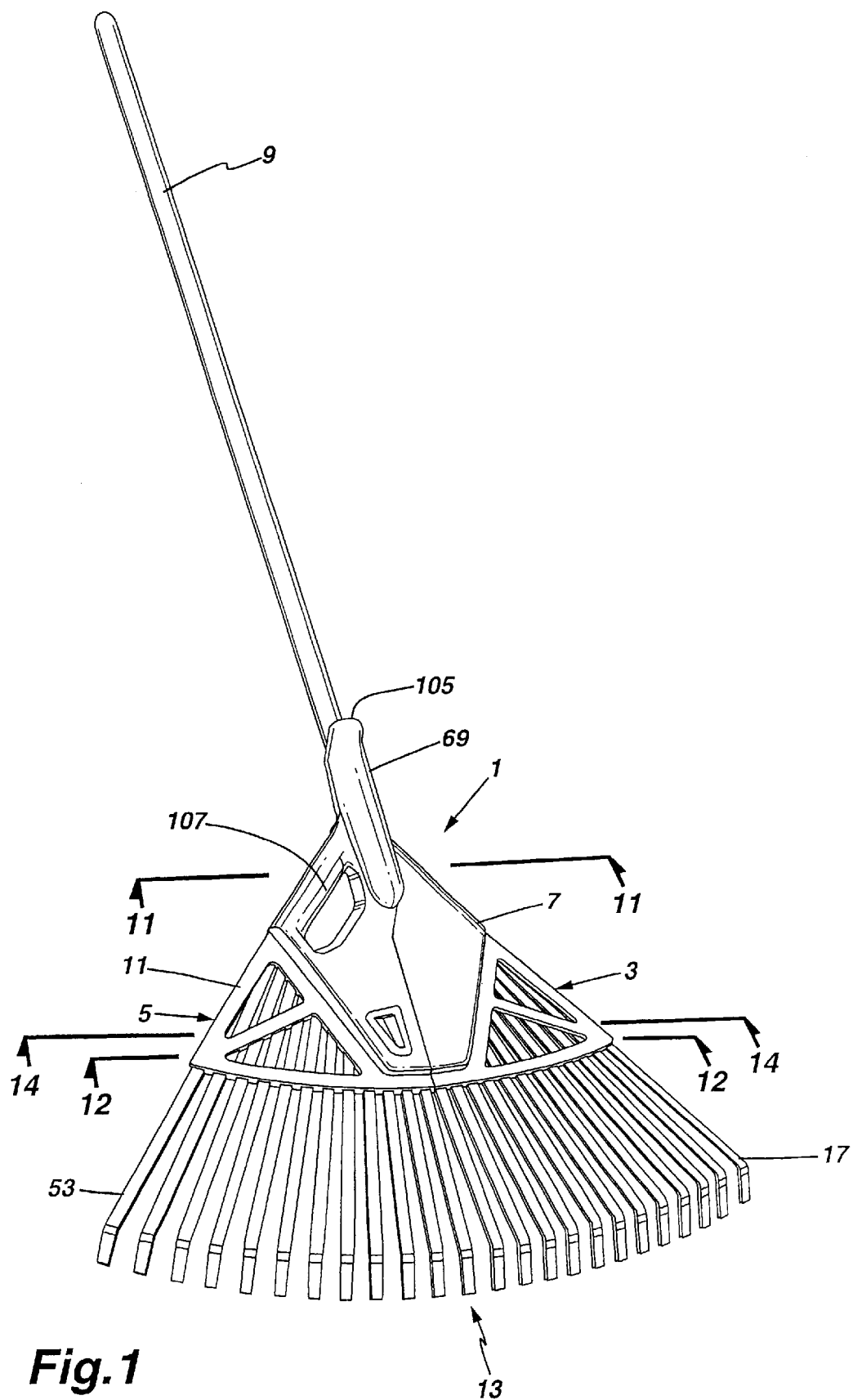
FIG. 1 is a perspective view of a rake according to a preferred embodiment of the invention, in a leaf-raking mode.
Figure 2:
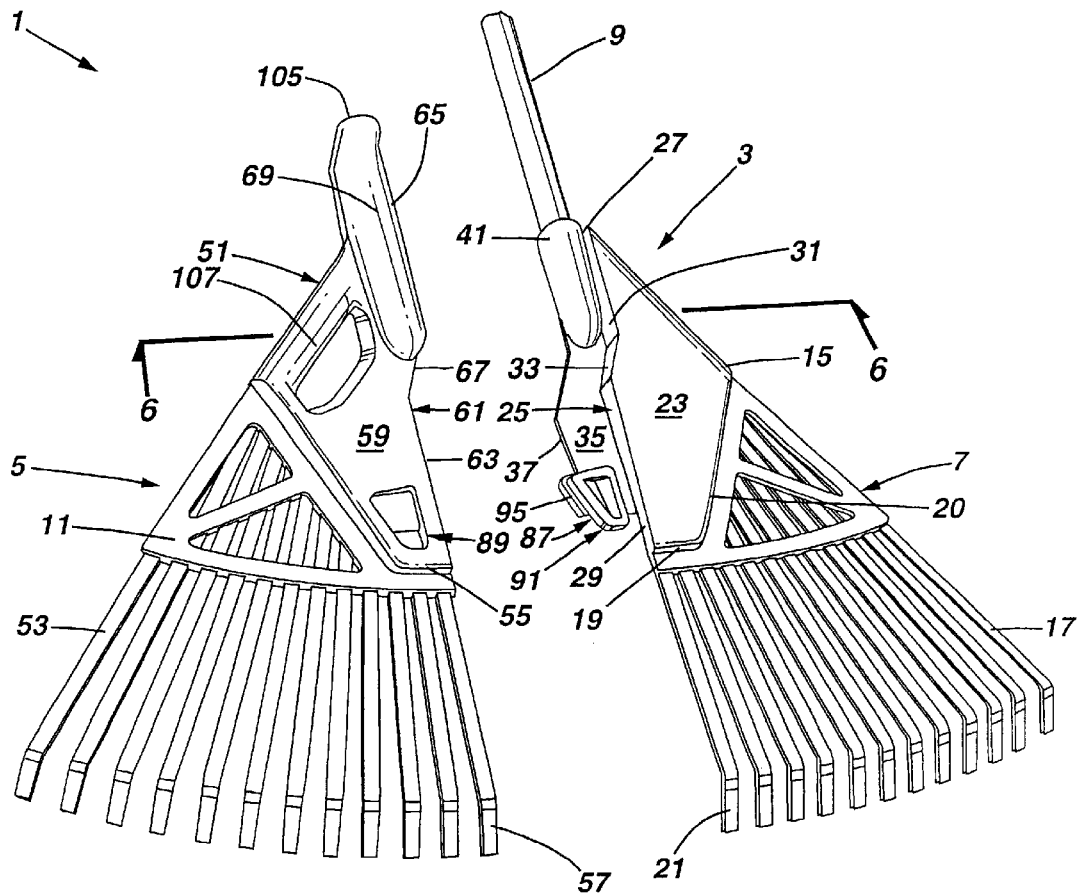
FIG. 2 is perspective, disassembled, view of the rake of FIG. 1, showing the two parts of the rake.

The rake 1 of the preferred present invention as shown in FIGS. 1 and 2, comprises two parts 3, 5.

The first rake part 3 has a first rake head section 7 attached at one end to one end of a rake handle 9.

The second rake part 5 has a second rake head section 11 and is detachably connected to the first rake part 3.

Figure 3:
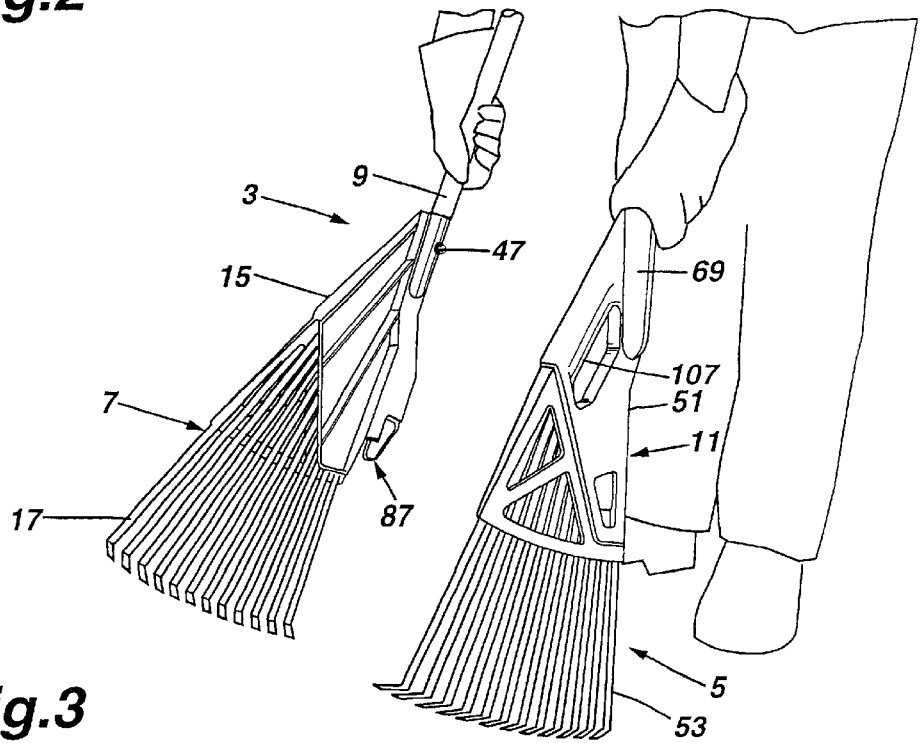
FIG. 3 is a perspective view showing the rake used when the two rake parts are disassembled.

When the second rake part 5 is connected to the first rake part 3, the first and second rake head sections 7, 11 together form a normal rake head 13 as shown in FIG. 1 and the rake formed by the two connected parts can be used in a normal manner to rake debris, such as leaves, into a pile. When the second rake part 5 is detachably disconnected from the first rake part 3, the two parts can be used manually, one in each hand of a user, as shown in FIG. 3, to grasp the pile of debris between them.

Figures 4, 5:
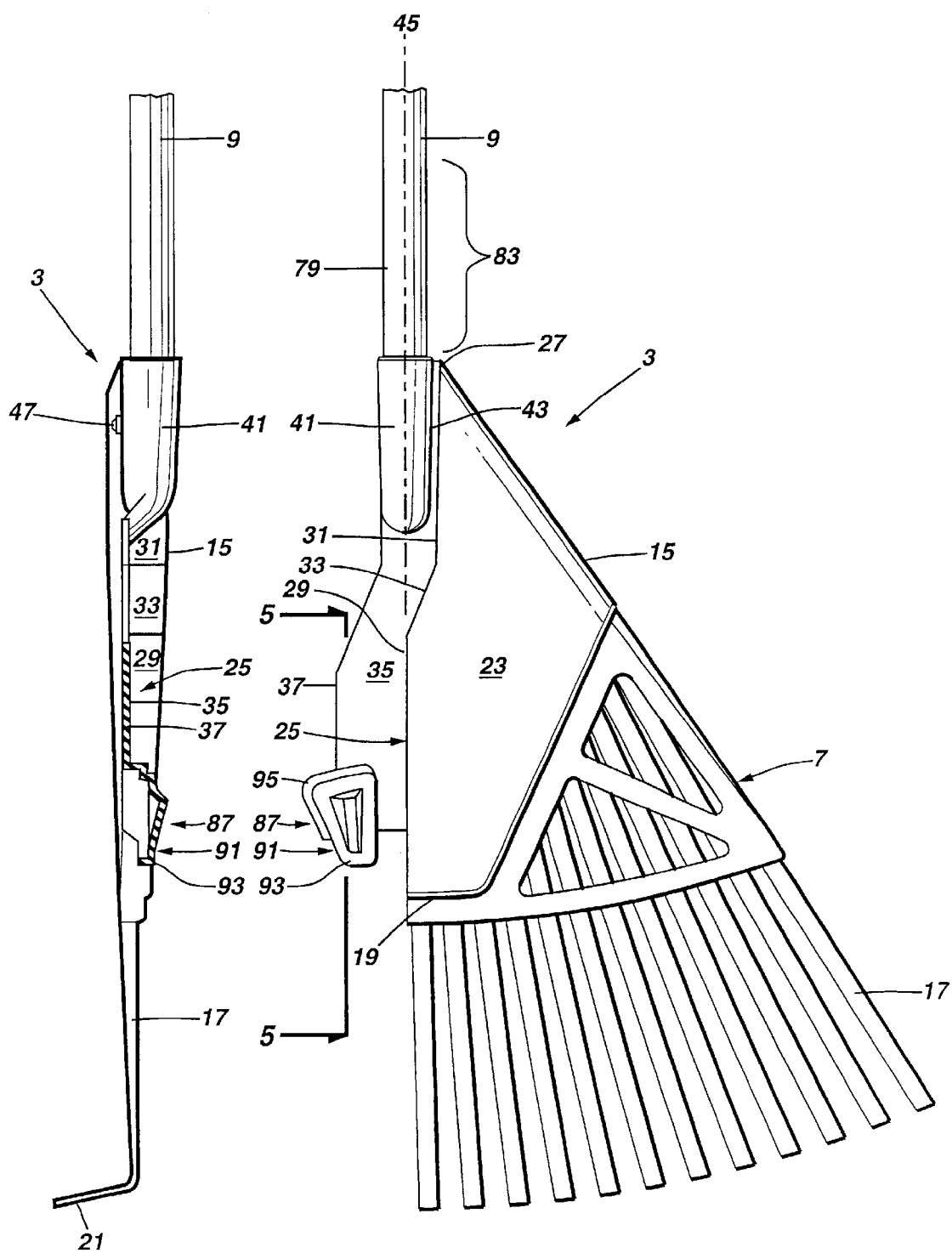
FIG. 4 is a detail plan view of one of the rake parts.
FIG. 5 is a cross section view taken along line 5—5 in FIG. 4.

In more detail, as shown in FIGS. 2, 4 and 5, the first rake head section 7, of the first rake part 3, has a base 15 with a set of tines 17 extending forwardly from the front end 19, and an angled front side 20, of the base 15. The tines 17 are resilient, flat strips with their free end portions 21 bent generally transversely to the rest of their length so as to more easily rake and gather debris. The base 15 has a top wall 23 and an inner side wall 25 extending between its front end 21 and its rear end 27. The side wall 25 is transverse to the top wall 23 and has a straight front portion 29 and a straight rear portion 31 laterally offset to the outside from the front portion 29. The front and rear portions 29, 31 are joined by a short angled portion 33. The side wall 25 forms part of aligning means as will be described. A narrow flange 35 extends laterally to the inside from the bottom of the side wall 25, the flange 35 extending from near the front end 21 of the base to the rear end 27. The flange 35 is below the top wall 23 of the base but parallel to it. The free side edge 37 of the flange 35 generally follows the contour of the side wall 25. The flange forms part of abutment means as will be described.

Figure 6:
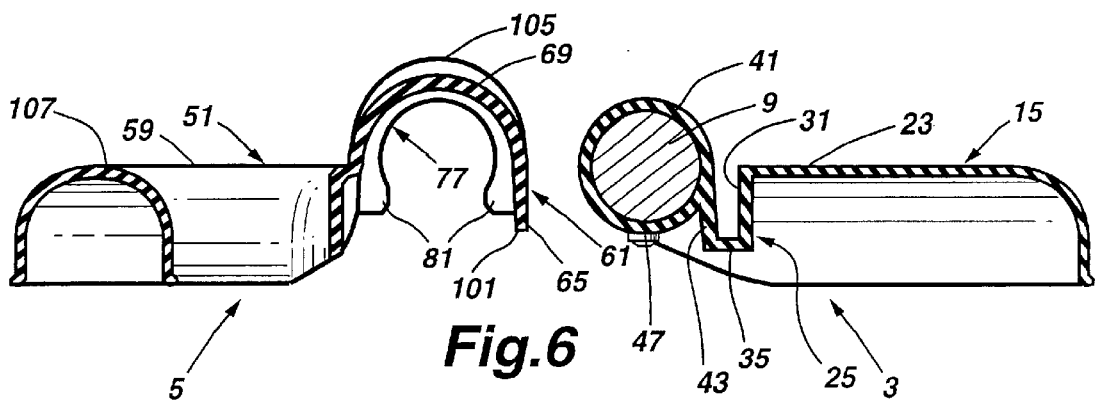
FIG. 6 is a cross-section view taken along line 6—6 of FIG. 2.

A tubular member 41 is carried by the flange 35 as shown in FIGS. 4 and 6, the tubular member 41 adjacent and parallel to the rear portion 31 of the side wall 25. A straight side wall 43 extends radially downwardly from the inside of the tubular member 41, parallel to the rear portion 31 of the side wall 25 and slightly spaced from it. The rear portion of the flange 35, which is quite narrow adjacent the rear portion 31 of the side wall 25, joins the bottom of the side wall 43 to the bottom of the rear portion 31 of the side wall 25 to connect the tubular member 41 to the base 15. The tubular member 41 snugly receives the one end of the handle 9. The longitudinal axis 45 of the tubular member 41 and of the rake handle 9 is aligned with the front portion 29 of the side wall 25 of the base 15. Fasteners 47 securely connect the handle 9 to the tubular member 41 to form the first rake part 3. The fasteners 47 can be of the detachable or removable type to allow replacement of the handle 9 or the first rake head section 7 if either breaks.

Figures 7, 8:
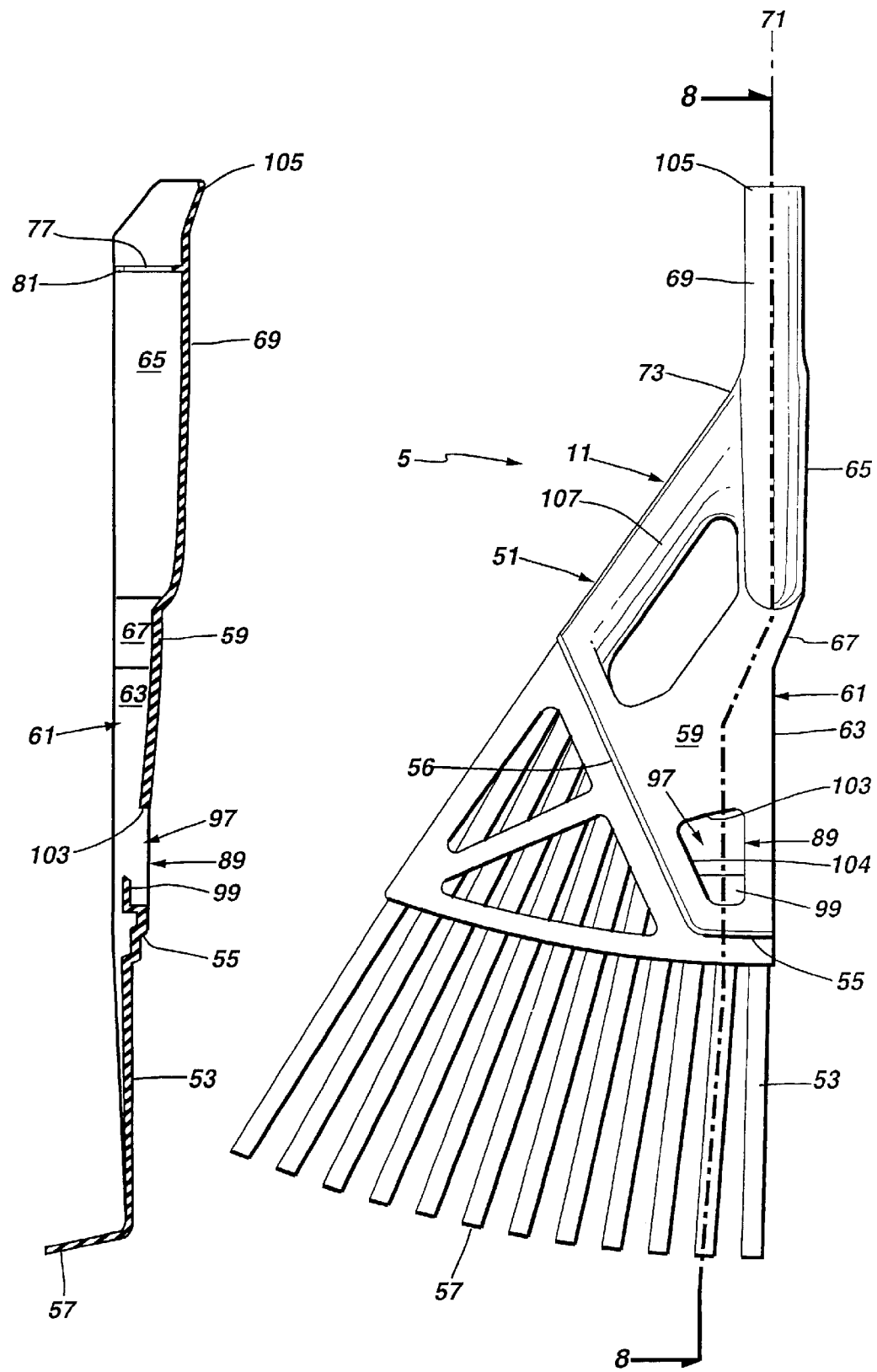
FIG. 7 is a detail plan view of the other rake part.
FIG. 8 is a cross section view taken along line 8—8 in FIG. 7.
Figure 14:
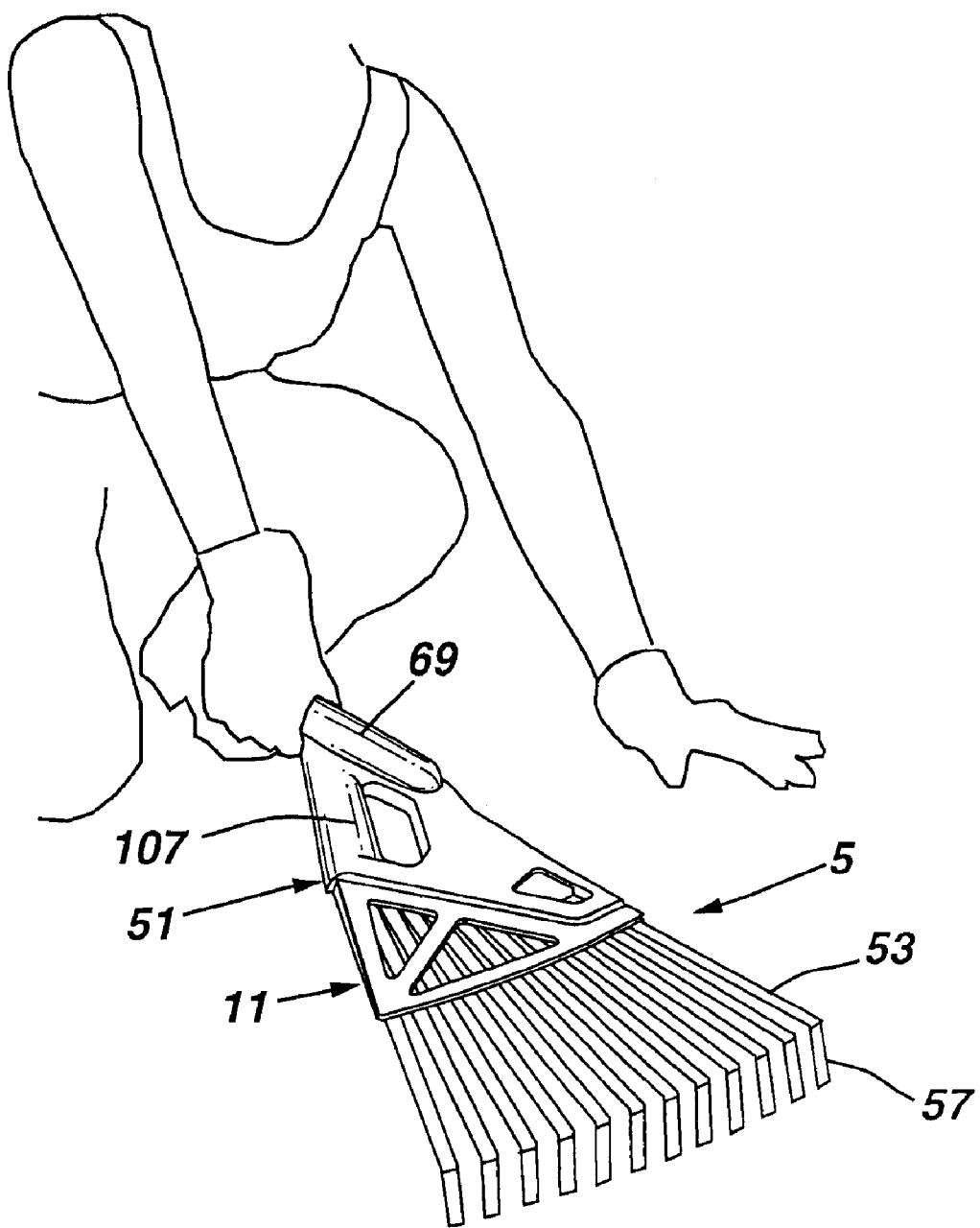
FIG. 14 appearing on the same sheet of drawings as FIG. 3, is a perspective view showing the other rake part being used alone.

The second rake head section 11 of the second rake part 5, as shown in FIGS. 2, 7 and 8, also has a base 51 with a set of tines 53 extending forwardly from the front end 55, and an angled front side 56, of the base 51. The tines 53 are the same as the tines 17 and have bent free end portions 57. The base 51 has a top wall 59 and an inner side wall 61 with the wall 61 being transverse to the top wall 59. The side wall 61 has a straight forward portion 63; a straight rear portion 65 that is laterally offset to the inside from the front portion 63 but parallel to it; and a short angled portion 67 joining the front and rear portions 63, 65. The side wall 61 forms part of the aligning means and part of the abutment means as will be described.

A semi-cylindrical member 69, as shown in FIGS. 6 and 7, is attached to the rake head section 11 and extends between the top of the rear portion 65 of the side wall 61, and the top wall 59 of the base 51 as shown in FIG. 6. The semi-cylindrical member 69 is located above the top wall 59 of the base 51 and the rear portion 65 of the side wall 61, and has its longitudinal axis 71 aligned with the forward portion 63 of the inner side wall 61. The semi-cylindrical member 69 extends past the rear end 73 of the base 51 and forms a handle for the rake part 5.

The first and second rake parts 3, 5 have a first set of cooperating connecting means 77, 79 for use in detachably connecting the first and second rake parts 3, 5 together. The connecting means 77 on the second rake part 5, as shown in FIG. 6, comprises a semi-circular rib 81 formed on the inner surface of the handle member 69 above the rear end 73 of the base 51. The rib 81 is sized to "snap" over the portion 83 of the handle 9 located just above the tubular member 41 on the first rake part 3 as shown in FIG. 4. The portion 83 of the handle 9 forms the second part 79 of the cooperating connecting means. Two spaced-apart ribs 81 could be used if desired.

Preferably, the first and second rake parts 3, 5 also have a second set 87, 89 of cooperating connecting means. The connecting means 87 of the second set includes a hook 91 formed on the top of the flange 35, and located adjacent its front edge on first rake part 3. The hook 91 has a forwardly projecting tip 93. The hook also has a shoulder 95 around its rear, and part of its outside, edges as shown in FIGS. 2 and 4. The shoulder 95 is slightly below the top of the hook 91 and serves as an abutment as will be described. The connecting means 89 of the second set on the second rake part 5 comprises an opening 97 formed in the top wall 59 of the base 51 adjacent its side wall 61 and front end 55. The opening 97 has a short ledge 99 at its front end spaced below the top wall 59 a distance generally the same as the thickness of the tip 93 of the hook 91.

The rake is assembled by passing the hook 91 through the opening 97 to locate the tip 93 on the ledge 99 as shown in FIG. 9. The rake part 5 is rotated to have its handle member 69 forwardly of the tubular member 41 on the rake part 3 while its tines 53 are behind the tines 17 on the rake part 3 allowing the hook 91 to easily pass into the opening 97 as shown in FIG. 9. Once the hook 91 is in the opening 97, the rake part 5 is rotated counterclockwise, as shown by the arrow A when viewing FIG. 9, to "snap" the rib 81 in the handle member 69 over the handle portion 81 to lock the parts together as shown in FIG. 10. In this position, the hook tip 93 rests on the ledge 99 in the opening 97. In rotating the parts 3, 5 together, the offset side walls 25, 61 on both parts are aligned and abutted together to precisely align the ends 21, 57 of the tines 17, 53 on both parts.

Figure 11:
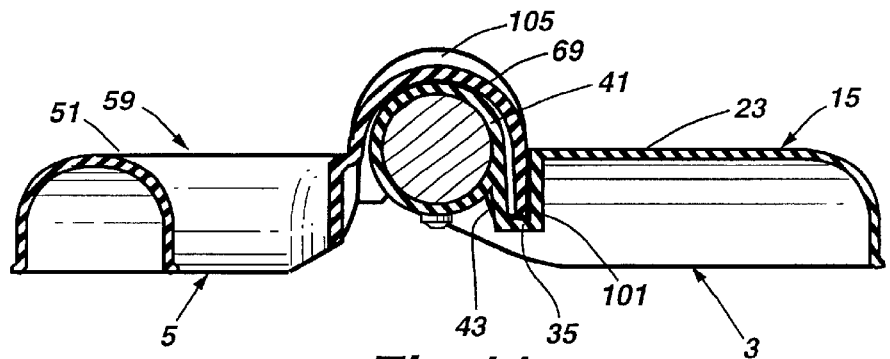
FIG. 11 is a cross-section view taken along line 11—11 in FIG. 1.
Figure 12:
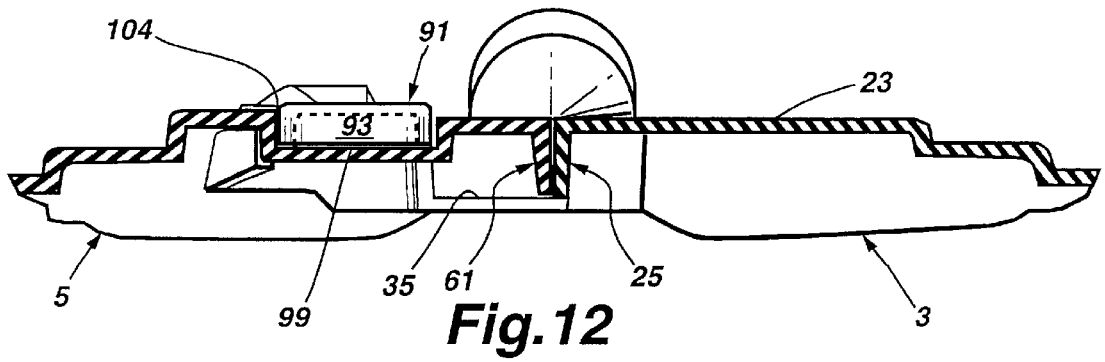
FIG. 12 is a cross-section view taken along line 12—12 in FIG. 1.
Figure 13:
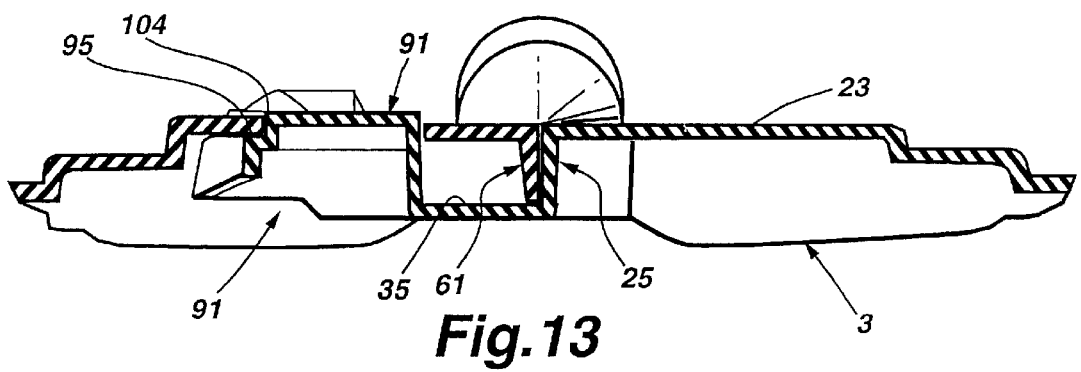
FIG. 13 is a cross-section view taken along line 13—13 in FIG. 1.

When locked together, inner side walls 25, 61 of the bases 15, 51 of both the parts 3, 5 abut and align the ends of the tines 19, 53 of both parts 3, 5. The bottom edge 101 of the inner side wall 61 on part 5 abuts on the flange 35 on part 3 as shown in FIGS. 11, 12. The top of the hook 91 is flush with the top surface of the base on part 5. The hook 91 not only connects the parts together but also prevents rotation of the parts. The tip 93 of the hook, resting on the ledge 99, prevents rotation of part 5 relative to part 3, in a clockwise direction when viewing the rake from the front in a direction aligned with the handle. The rear and outside edges 103, 104 defining part of the opening 97 made in the top wall 59, rest on the shoulder 95 of the hook 91, as shown in FIGS. 10 and 13, and prevent rotation of the part 5 counterclockwise relative to part 3 when viewing the rake from the front in a direction aligned with the handle.

With the hook 91 resting on the ledge 99 and offset laterally from the center line of the assembled rake; and with the bottom edge 101 of the inner side wall 61 resting on the flange 35 and again offset from the center line of the assembled rake, the rake part 5 is prevented from rotating clockwise relative to rake part 3, (see FIGS. 11 and 12), when using the rake in a normal manner. With edges 103, 104 of top wall 59 resting on the shoulder 95 of the hook 91 and with edge 104 particularly, well offset from the center line, the part 5 is also prevented from rotating in a counter-clockwise direction when viewing FIGS. 11, 12 and 13.

The rake is easily disassembled by "snapping" the handle member 69 off the tubular member 41 and sliding the part 5 off the hook 91. The rear end of the handle member can be upturned, as shown at 105, to make it easier to lift the handle member off the handle 9. The two parts can be used together in clam shell fashion to pick up leaves as shown in FIG. 3. The small rake part 5 can also be used, via handle member 69, as a small rake in tight places as shown in FIG. 13. If desired, the small rake part 5 can have a hand hold 107 formed in the base 51 near its rear end 73 to help in picking up debris between the rake parts.

While the first rake head section has been shown to be about the same width as the second rake head section, one rake head section could be wider than the other. Also, while the handle member on the second rake part has been shown to cover the tubular member and part of the handle on the first rake part and to be attached to the handle of the first rake part, it could also cover either the handle portion or the tubular member and be attached to either. Other connecting means on the rake parts, than those shown, can be employed. Other alignment and rotation preventing means could also be employed.

What is claimed is:

1. A rake comprising:

a first rake part, having a handle with a longitudinal axis, a first rake head section connected to one end of the handle and a tubular member adjacent and parallel to a rear portion of a side wall of the first rake head section for receiving the one end of the handle; and a second, separate, rake part, having a second rake head section wherein the second rake part has a semi-cylindrical member attached to the second rake head section, said semi-cylindrical member being sized and positioned to cover, and fit onto, the tubular member and at least one portion of the handle when the first and second rake parts are connected together;

cooperating connecting means on both rake parts to detachably connect the second rake part to the first rake part to have the first and second rake head sections side-by-side forming a full-size, rake head at the one end of the handle; and the connected rake parts forming the rake for use to rake debris into a pile, the detached rake parts being useful to grasp between them and transfer the pile of debris.

2. A rake as claimed in claim 1, wherein the semi-cylindrical member forms a handle for the second rake part when the first and second rake parts are detached.

3. A rake as claimed in claim 2, wherein the cooperating connecting means comprises a semi-circular rib formed on an inner surface of the semi-circular member, said rib being positioned and sized to snap over a portion of the handle just above the tubular member of the first rake part.

4. A rake as claimed in claim 3, wherein the cooperating connecting means also comprises a hook on the first rake part and an opening on the second rake part, the hook passing through the opening to abut the second rake part and thus connect the parts together.

5. A rake as claimed in claim 4, wherein the hook and opening are spaced apart laterally from the longitudinal axis of the handle when the rake parts are connected together, the hook abutting on the second rake part and thus preventing rotation of the second rake part clockwise about the first rake part.

6. A rake as claimed claim 5, wherein said rake also comprises:

abutment means for preventing rotation of the second rake part clockwise about the first rake part when the parts are connected together.

7. A rake as claimed in claim 6, wherein:

the first rake part has a base with an inner side wall having a bottom and a flange extending laterally from the bottom of the inner side wall;

the second rake part has a base with an inner side wall having a bottom edge;

said inner side walls abutting when the parts are connected together with the bottom edge of the inner side wall of the second rake part resting on the flange to form the abutment means, the bottom edge of the inner side wall of said second rake part being spaced apart from the longitudinal axis of the rake handle on the side of the rake where is located the first rake part when the parts are connected together.

8. A rake as claimed in claim 7, wherein said rake further comprises:

aligning means on the rake parts to align said rake parts longitudinally when connected together.

9. A rake as claimed in claim 8, wherein the inner side walls of the first and second rake parts are complementary and abut when the rake parts are connected together, thereby forming the aligning means.

10. A rake as claimed in claim 1, wherein the cooperating connecting means comprises a hook on the first rake part and an opening on the second rake part, the hook passing through the opening to abut the second rake part and thus connect the parts together.

11. A rake as claimed in claim 10, wherein the hook and opening are spaced apart laterally from the longitudinal axis of the handle when the rake parts are connected together, the hook abutting on the second rake part and thus preventing rotation of the second rake part clockwise about the first rake part.

12. A rake as claimed in claim 11, wherein:

the first rake part has a base with an inner side wall having a bottom and a flange extending laterally from the bottom of the inner side wall;

the second rake part has a base with an inner side wall having a bottom edge;

said inner side walls abutting when the parts are connected together with the bottom edge of the inner side wall of the second rake part resting on the flange to form the abutment means, the bottom edge of the inner side wall of said second rake part being spaced apart from the longitudinal axis of the rake handle on the side of the rake where is located the first rake part when the parts are connected together.

13. A rake as claimed in claim 12, wherein said rake further comprises:

aligning means on the rake parts to align said rake parts longitudinally when connected together.

14. A rake as claimed in claim 1, wherein said rake further comprises:

aligning means on the rake parts to align said rake parts longitudinally when connected together.

* * * * *